(12) United States Patent
Kim et al.

(10) Patent No.: US 10,359,869 B2
(45) Date of Patent: Jul. 23, 2019

(54) STYLUS PEN, ELECTRONIC APPARATUS FOR RECEIVING SIGNAL FROM STYLUS PEN, AND CONTROL METHOD THEREOF

(71) Applicant: Samsung Electronics Co., Ltd., Gyeonggi-do (KR)

(72) Inventors: Kang-nam Kim, Gyeonggi-do (KR); Byung-hoon Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/471,685

(22) Filed: Mar. 28, 2017

(65) Prior Publication Data
US 2017/0277284 A1 Sep. 28, 2017

(30) Foreign Application Priority Data

Mar. 28, 2016 (KR) .......................... 10-2016-0036676

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/0416* (2013.01); *G06F 3/044* (2013.01)

(58) Field of Classification Search
CPC .. G06F 3/0383; G06F 3/03545; G06F 3/0416; G06F 3/044
See application file for complete search history.

(56) References Cited

U.S. PATENT DOCUMENTS 8,217,918 B2 7/2012 Morag et al.
8,427,454 B2 4/2013 Yeh et al.
(Continued)

FOREIGN PATENT DOCUMENTS

JP 2013225270 10/2013
KR 101267985 5/2013
(Continued)

OTHER PUBLICATIONS

International Search Report dated May 22, 2017 issued in counterpart application No. PCT/KR2017/001376, 11 pages.

*Primary Examiner* — Lisa S Landis
(74) *Attorney, Agent, or Firm* — The Farrell Law Firm, P.C.

(57) ABSTRACT

A stylus pen, an apparatus for receiving a signal from the stylus pen, and a control method are provided. The stylus pen includes a conductive tip disposed at a first end of the stylus pen. The stylus pen also includes a conductive tail disposed at a second end of the stylus pen. The stylus pen further includes a resonant circuit unit electrically connected to the conductive tip and the conductive tail. The resonant circuit is configured to generate a first response signal having a first resonant frequency corresponding to a signal entering the conductive tip from the electronic apparatus, to output the first response signal through the conductive tip, to generate a second response signal having a second resonant frequency corresponding to a signal entering the conductive tail from the electronic apparatus, and to output the second response signal through the conductive tail.

18 Claims, 21 Drawing Sheets

(51) Int. Cl.
   *G06F 3/041*        (2006.01)
   *G06F 3/044*        (2006.01)

(56)                References Cited

U.S. PATENT DOCUMENTS

| | | | |
|---|---|---|---|
| 8,493,369 B2 | 7/2013 | Liang et al. | |
| 8,766,954 B2 | 7/2014 | Vuppu et al. | |
| 2001/0038384 A1* | 11/2001 | Fukushima | G06F 3/03545 345/179 |
| 2008/0149402 A1* | 6/2008 | Vos | G06F 3/03545 178/19.01 |
| 2010/0051356 A1 | 3/2010 | Stern et al. | |
| 2011/0155479 A1* | 6/2011 | Oda | G06F 3/03545 178/18.06 |
| 2014/0002422 A1* | 1/2014 | Stern | G06F 3/03545 345/179 |
| 2014/0132529 A1 | 5/2014 | Jeong | |
| 2016/0216784 A1 | 7/2016 | Kim et al. | |

FOREIGN PATENT DOCUMENTS

| | | |
|---|---|---|
| KR | 1020160092360 | 8/2016 |
| WO | WO 2013/003128 | 1/2013 |

\* cited by examiner

140

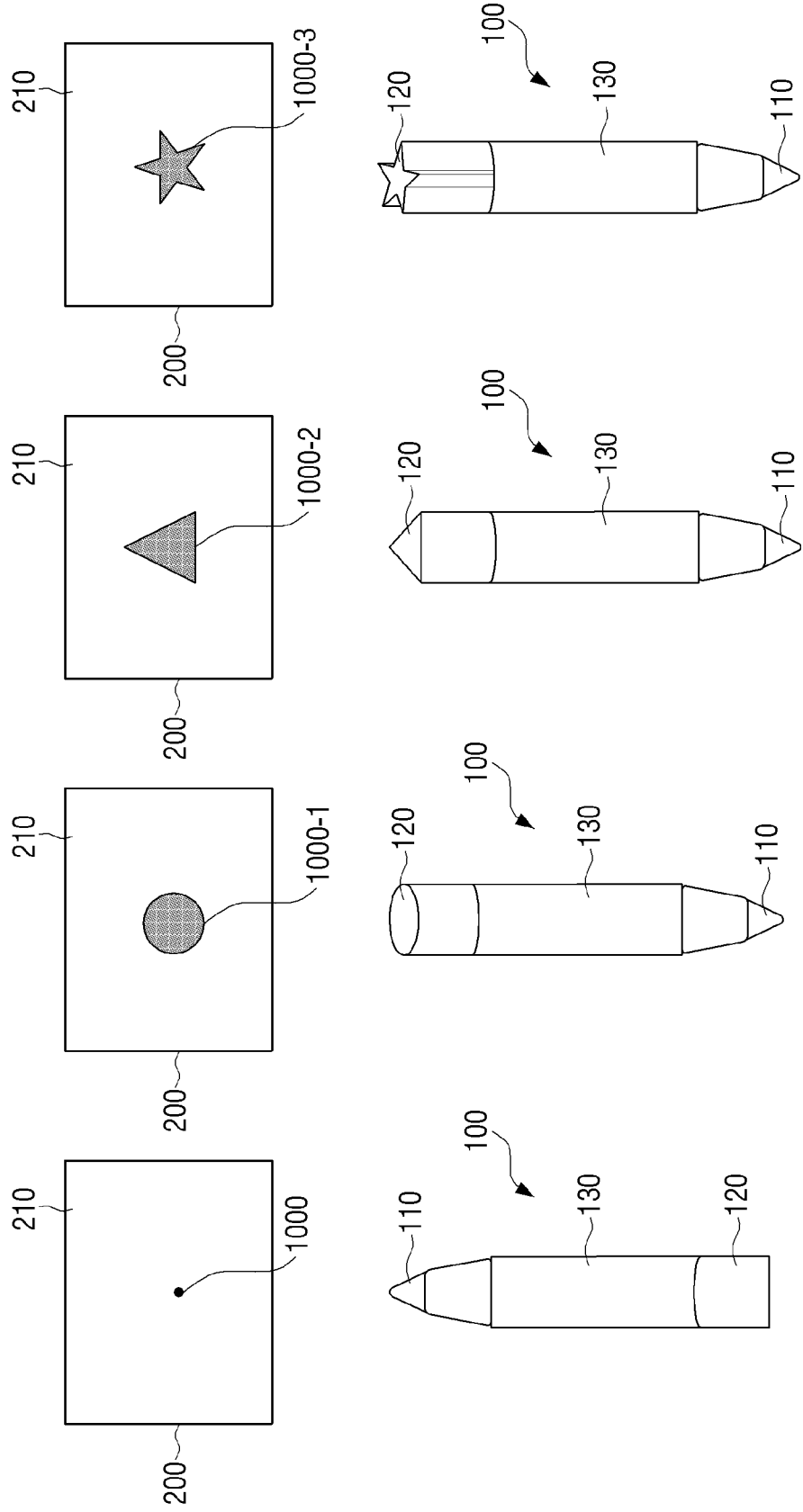

STYLUS PEN, ELECTRONIC APPARATUS FOR RECEIVING SIGNAL FROM STYLUS PEN, AND CONTROL METHOD THEREOF

PRIORITY

This application claims priority under 35 U.S.C. § 119(a) to Korean Patent Application No. 10-2016-0036676, filed in the Korean Intellectual Property Office on Mar. 28, 2016, the content of which is incorporated herein by reference.

BACKGROUND

1. Field of the Disclosure

The present disclosure generally relates to a stylus pen and an electronic apparatus for receiving a signal from the stylus pen, and more particularly, to a stylus pen having a conductive tip formed at one end thereof to perform a pen function, and a conductive tail formed at the other end to perform an eraser function, and an electronic apparatus which interworks with the stylus pen.

2. Description of the Related Art

In electronic apparatuses having a touch screen, such as, for example, a tablet personal computer (PC) or a smart phone, a user may directly input information to the display screen using a stylus pen. In addition, the user may write desired content or edit already written content by bringing the stylus pen into contact with the touch screen.

The stylus pen may be one of various types of pens, according to its implementation method. When the stylus pen is implemented in an electromagnetic resonance method, the stylus pen includes a coil to induce a current by an external magnetic field signal.

When the stylus pen is implemented in an electrically coupled resonance method, the stylus pen includes a conductive tip. Accordingly, when the conductive tip of the stylus pen touches the touch screen of the electronic apparatus or is within a predetermined distance from the touch screen, capacitive coupling is performed between the conductive tip and an electrode in the touch screen.

A coil inductor (for example, having a length of 3 mm phi×2 mm) to which a ferrite coil is connected is used at the tip of the stylus pen to implement a pen function at one end of the stylus pen and implement an eraser function at the other end of the stylus pen. In order to implement other functions, such as the eraser function, a coil inductor, to which a ferrite coil is connected, is required at the other end of the stylus pen. However, when the stylus pen is implemented using the coil inductor, the size of the stylus pen and the manufacturing cost increases. In addition, the other end of the stylus pen, which performs the eraser function, may have a designated eraser shape.

SUMMARY

The present disclosure has been made to address at least the above problems and/or disadvantages and to provide at least the advantages described below. Accordingly, an aspect of the present disclosure provides a stylus pen that provides a pen function on one end thereof and provides an eraser function of various shapes on another end thereof, which is attachable and detachable, using a single resonant circuit, and a control method of an electronic apparatus including a touch screen which interworks with the stylus pen.

According to an aspect of the present disclosure, a stylus pen is provided for use with an electronic apparatus. The stylus pen includes a conductive tip disposed at a first end of the stylus pen. The stylus pen also includes a conductive tail disposed at a second end of the stylus pen. The stylus pen further includes a resonant circuit unit electrically connected to the conductive tip and the conductive tail. The resonant circuit is configured to generate a first response signal having a first resonant frequency corresponding to a signal entering the conductive tip from the electronic apparatus, to output the first response signal through the conductive tip, to generate a second response signal having a second resonant frequency corresponding to a signal entering the conductive tail from the electronic apparatus, and to output the second response signal through the conductive tail.

According to another aspect of the present disclosure, an electronic apparatus is provided that includes a touch screen, and an electrode unit that is included in the touch screen and that receives a response signal generated in a stylus pen. The electronic apparatus also includes a processor configured to, in response to a first end of the stylus pen being brought into contact with the touch screen and a first response signal having a first resonant frequency being received through the electrode unit, perform a first function, and, in response to a second end of the stylus pen being brought into contact with the touch screen and a second response signal having a second resonant frequency being received through the electrode unit, perform a second function.

According to another aspect of the present disclosure, a control method of an electronic apparatus is provided. A first function is performed in response to a first end of a stylus pen being brought into contact with a touch screen of the electronic apparatus and a first response signal having a first resonant frequency being received at the electronic apparatus. A second function is performed in response to a second end of the stylus pen being brought into contact with the touch screen and a second response signal having a second resonant frequency being received at the electronic apparatus.

According to another aspect of the present disclosure, a stylus pen for use with an electronic apparatus is provided. The stylus pen includes a body, a conductive tip disposed at a first end of the body, and a conductive tail disposed at a second end of the body. The stylus pen also includes a resonant circuit disposed within the body and electrically connected to the conductive tip and the conductive tail. The resonant circuit is configured to output a first response signal having a first resonant frequency through the conductive tip, and to output a second response signal having a second resonant frequency through the conductive tail. The first resonant frequency is different from the second resonant frequency.

BRIEF DESCRIPTION OF THE DRAWINGS

The above and/or other aspects, features, and advantages of the present disclosure will be more apparent from the following detailed description when taken in conjunction with the accompanying drawings, in which:

FIGS. 10A to 10C are diagrams illustrating a state in which a user touches a touch screen with a stylus pen, according to an embodiment of the present disclosure;

DETAILED DESCRIPTION

Figure 1:
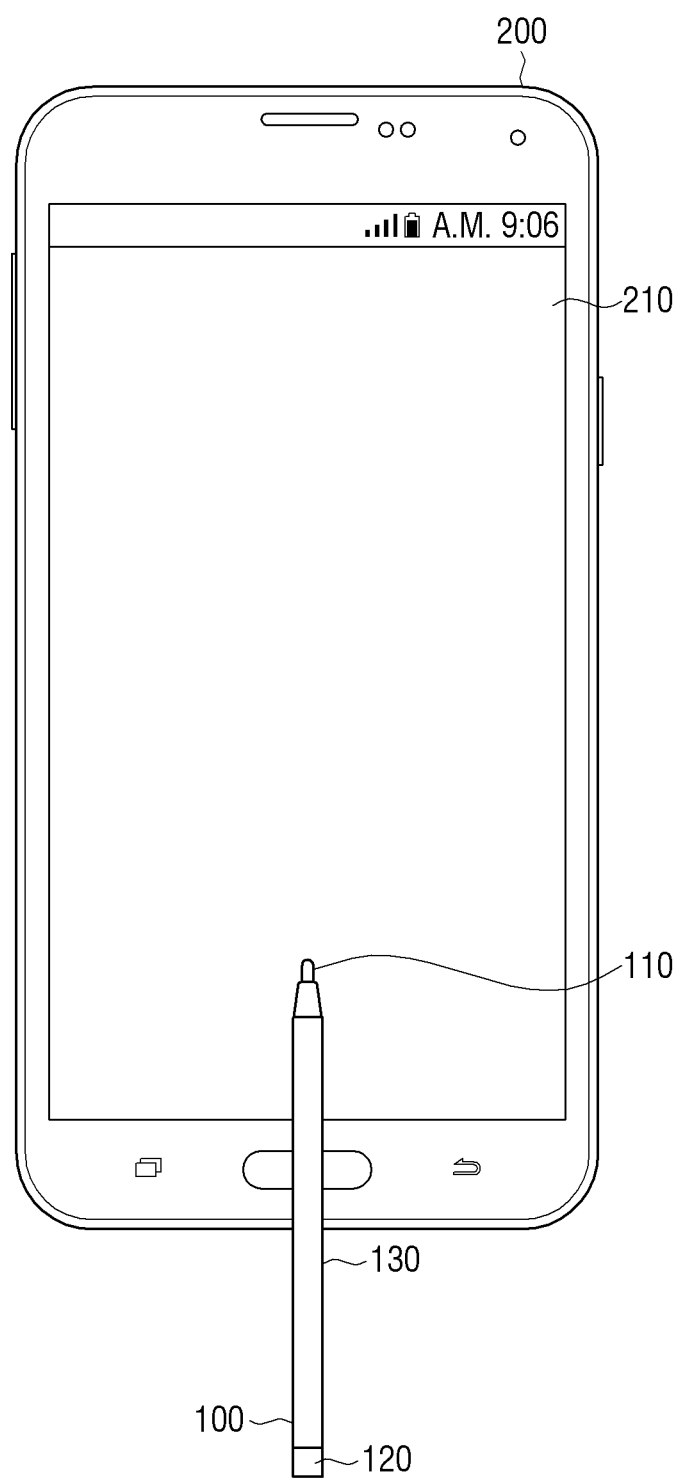
FIG. 1 is a diagram illustrating operations of a stylus pen and an electronic apparatus, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The technical terms used herein are for the purpose of describing particular embodiments and are not intended to limit the present disclosure. In addition, the technical terms used herein should be interpreted as having the same meanings as those generally understood by an ordinary skilled person in the related art unless they are defined otherwise, and should not be interpreted as having excessively broad meanings or excessively narrow meanings. In addition, if the technical terms used herein do not exactly represent the idea of the present disclosure, they should be substituted with technical terms that can be correctly understood by an ordinary skilled person in the related art, and should be understood. In addition, the general terms used herein should be interpreted as defined in a dictionary or within the context, and should not be interpreted as having excessively narrow meanings.

In addition, the singular forms of words used herein are intended to include the plural forms as well, unless the context clearly indicates otherwise. In addition, the term "comprise" or "include", as used herein, should not be interpreted as necessarily including all of the elements or steps described, and may be interpreted to not include some of the elements or some of the steps or to include additional elements or steps.

In addition, the term "unit", used in relation to the elements described herein, may be used interchangeably with other terms, and does not have its own distinct meaning or role.

Terms such as "first" and "second", as used herein, may explain various elements, and do not limit the corresponding elements. These terms may be used for the purpose of distinguishing one element from another element. For example, a first element may be referred to as a second element without departing from the scope of the present disclosure, and similarly, a second element may be referred to as a first element.

Herein, the expression "the conductive tip and the conductive tail of the stylus pen being brought into contact with the electronic apparatus" may mean that the conductive tip and the conductive tail are brought into contact with a touch area of the electronic apparatus including a touch screen.

FIG. 1 is a diagram illustrating operations of a stylus pen and an electronic apparatus, according to an embodiment of the present disclosure.

Referring to FIG. 1, an electronic apparatus 200 includes a touch screen 210, which is formed of a touch panel. The electronic apparatus 200 may include a plurality of electrodes, and may apply a driving signal to at least one electrode, thereby delivering the driving signal to a resonant circuit of a stylus pen 100, which approaches the touch screen 210, through electrically coupled resonance.

In addition, the electronic apparatus 200 may receive, from at least one electrode, a response signal, which is excited in the resonant circuit of the stylus pen 100, and determine the location of the stylus pen 100.

The electronic apparatus 200 may be embodied as one of various kinds of electronic apparatuses provided with a touch screen, such as, for example, a laptop, a mobile phone, a smart phone, a portable multimedia player (PMP), an MP3 player, a game console, a kiosk, a monitor, etc.

The stylus pen 100 may form capacitance with at least one of the plurality of electrodes in the electronic apparatus 200, and receive energy for resonance through the formed capacitance. The energy for the resonance may refer to an electric field transmission signal that is transmitted from the stylus pen 100 to the electronic apparatus 200.

In addition, the stylus pen 100 may transmit the response signal, which is excited in the resonant circuit, to at least one electrode in the electronic apparatus 200. Accordingly, the electronic apparatus 200 may provide the electric field transmission signal to the stylus pen 100 through electrically coupled resonance, and the stylus pen 100 may operate even when it does not have its own power source. Such a stylus pen 100 may be referred to as a stylus pen of a passive method.

In addition, the stylus pen 100 includes a conductive tip 110 and a conductive tail 120. The conductive tip 110 is formed at one end of the stylus pen 100 and the conductive tail 120 is formed at the other end of the stylus pen 100. The conductive tip 110 and the conductive tail 120 may be made of conductive material. That is, the conductive material may be a metallic material or a thin nonconductor, and may be a material that can transmit signals and has a dielectric constant.

The conductive tip 110 and the conductive tail 120 may perform their respective functions by touching the touch screen 210 or hovering over the touch screen 210. In particular, a coating layer made of an insulating material may be added to the outer surfaces of the conductive tip 110 or the conductive tail 120 so as to increase a sense of touch when the conductive tip 110 or the conductive tail 120 is directly in contact with the touch screen 210, and performs their respective functions. The insulating material may include, for example, robber, plastic, glass, etc.

The conductive tip 110 and the conductive tail 120 may be connected to a resonant circuit unit provided in the stylus pen 100. The resonant circuit unit may generate a signal corresponding to a signal that enters through the conductive tip 110 and the conductive tail 120, and output the signal through the conductive tip 110 and the conductive tail 120. The resonant circuit unit is described in greater detail below with reference to FIGS. 2 and 4.

The conductive tip 110 and the conductive tail 120 are connected with each other via a body 130. The conductive tip 110 and the conductive tale 120 may be attachable to and detachable from the body 130, or may be integrally formed with the body 130. According to an embodiment of the present disclosure, the conductive tail 120 is of a removable type so that it can be attached to and detached from the body 130.

In addition, the conductive tail 120 may be an attachable and detachable configuration having various shapes. The electronic apparatus 200 may recognize the shape of the cross section of the conductive tail 110 contacting the electronic apparatus 200, using signal distribution, signal difference, etc. detected from the electrodes. In response to the conductive tail 120 being brought into contact with the touch screen 210, the electronic apparatus 200 may determine the cross section brought into contact based on a location where the conductive tail 120 is brought into contact with the touch screen 210. The electronic apparatus 200 may determine an erase area on the touch screen 210 according to the determined cross section.

Figure 2:
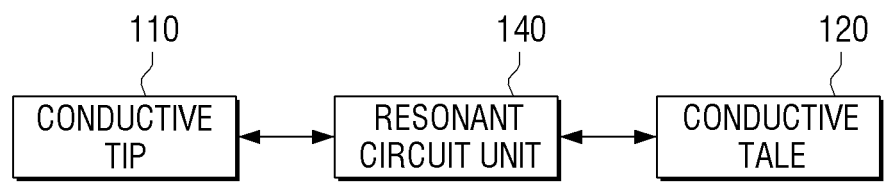
FIG. 2 is a diagram illustrating a configuration of a stylus pen, according to an embodiment of the present disclosure.

FIG. 2 is a block diagram illustrating a stylus pen, according to an embodiment of the present disclosure. Referring to FIG. 2, the stylus pen 100 includes the conductive tip 110, a resonant circuit unit 140, and the conductive tail 120.

The conductive tip 110 and the conductive tail 120 may form capacitance with at least one of the plurality of electrodes in the electronic apparatus 200. The conductive tip 110 and the conductive tail 120 may be formed of metallic material and may exist in nonconductive material. In addition, a part of the conductive tip 110 may be exposed to the outside. In addition, the conductive tip 110 and the conductive tail 120 may further include an insulating part to prevent direct contact with the outside to provide a smooth feeling of writing when the conductive tip 110 and the conductive tail 120 are brought into contact with the touch screen 210.

The conductive tail 120 may have various attachable and detachable shapes.

The resonant circuit unit 140 may receive energy for resonance through capacitive coupling between at least one electrode in the electronic apparatus 200 and the conductive tip 110 and the conductive tail 120. The resonant circuit unit 140 may accumulate signals inputted from the electronic apparatus 200, that is, electric energy having a resonant frequency. In addition, the resonant circuit unit 140 may output a signal caused by the accumulated electric energy even after the input of the signal inputted from the electronic apparatus 200 is stopped.

A signal terminal of the resonant circuit unit 140 may be electrically connected to the conductive tip 110 and the conductive tail 120. The resonant circuit unit 140 may be implemented by using a single chip inductor (for example, a Surface-mount device (SMD) type, etc.) and a capacitor. Variations of the resonant circuit, according to embodiments of the present disclosure, are described in detail below with reference to FIGS. 3A to 3C and FIG. 5.

In response to the conductive tip 110 touching the electronic apparatus 200, the resonant circuit unit 140 may generate a first response signal having a first resonant frequency corresponding to a signal entering the conductive tip 110 from the electronic apparatus 200, and output the first response signal through the conductive tip 110. The electronic apparatus 200 may perform a pen input function from the conductive tip 110 in response to the first response signal.

In response to the conductive tail 120 touching the electronic apparatus 200, the resonant circuit unit 140 may generate a second response signal having a second resonant frequency corresponding to a signal entering the conductive tail 110 from the electronic apparatus 200, and output the second response signal through the conductive tail 120. The electronic apparatus 200 may perform an eraser function from the conductive tail 120 in response to the second response signal.

Figure 3A:
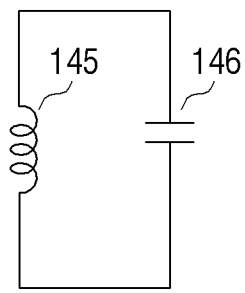
FIGS. 3A to 3C are diagrams illustrating a configuration of a resonant circuit of a stylus pen, according to an embodiment of the present disclosure.
Figure 3B:
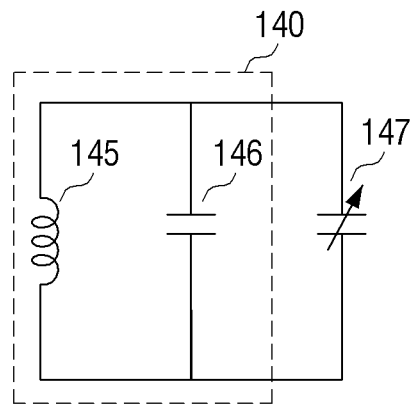
Figure 3C:
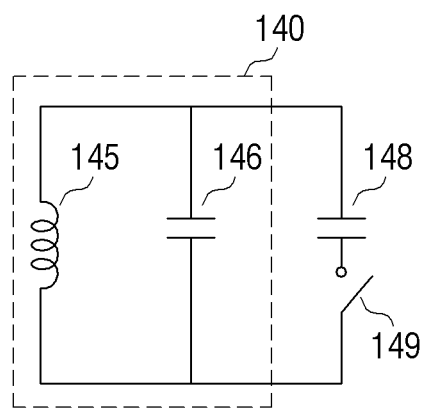

FIGS. 3A to 3C are diagrams illustrating the resonant circuit unit of the stylus pen, according to an embodiment of the present disclosure.

Herein, an inductor forming the resonant circuit is a chip inductor that is formed of a single chip, which does not require connection to a ferrite coil. For example, the chip inductor may be a chip of an SMD type, and may be attached and fixed to a printed circuit board (PCB) of the stylus pen. The chip inductor may be changed and implemented in various chip forms.

As described above with reference to FIGS. 1 and 2, in response to the stylus pen 100 emitting electromagnetic force (energy) by itself, the electronic apparatus 200 may detect the electromagnetic force of the stylus pen 100 on a pen detection area. The electronic apparatus 200 may measure coordinates of the detected electromagnetic force and determine the measured coordinates as a touch point of the stylus pen 100.

FIG. 3A is a circuit diagram showing a basic resonant circuit which is formed of a single inductor and a single capacitor.

Referring to FIG. 3A, the stylus pen 100 may have a resonant frequency $$\left(f_0 = \frac{1}{2\pi\sqrt{LC}}\right)$$

which is generated by a capacitance C of a capacitor 146 and an inductance L of an inductor 145, which are included in the basic resonant circuit 140.

Since the single chip inductor of the resonant circuit 140 is used in the present disclosure, the resonant circuit 140 may generate different resonant frequencies according to a capacitance electrically connected to the resonant circuit 140. By doing so, the stylus pen 100 may be implemented to output different response signals at the conductive tip 110 and the conductive tail 120 through an additional capacitor connected to the resonant circuit 140.

FIG. 3B is a circuit diagram showing a resonant circuit in which a variable capacitor is electrically connected to the basic resonant circuit shown in FIG. 3A in parallel.

Referring to FIG. 3B, the stylus pen 100 may have a sum capacitance of the capacitance of the capacitor 145 included in the basic resonant circuit 140 and a capacitance of a variable capacitor 147 in a resonant circuit 140-1.

The variable capacitor 147, which is a pen pressure detection capacitor, causes the capacitance of the resonant circuit 140-1 to be changed according to pen pressure provided to the electronic apparatus 200 by the stylus pen 100.

According to an embodiment of the present disclosure, the variable capacitor 147 for detecting the pen pressure may be implemented to be connected to the basic resonant circuit 140 and the conductive tip 110. On the other hand, the conductive tale 120 may be implemented to be connected to the basic resonant circuit 140.

In response to the conductive tip 110 being brought into contact with the electronic apparatus 200, the variable capacitor 147 may detect the pen pressure of the conductive tip 110. Accordingly, the conductive tip 110 may output the first response signal having the first resonant frequency based on the sum capacitance of the capacitance of the capacitor 145 included in the basic resonant circuit 140 and the capacitance of the variable capacitor 147 in the resonant circuit 140-1.

In response to the first response signal outputted from the conductive tip 110, the electronic apparatus 200 may perform a first function for pen input.

On the other hand, in response to the conductive tail 120 being brought into contact with the electronic apparatus 200, the conductive tail 120 may output the second response signal having the second resonant frequency based on the capacitance of the capacitor 145 included in the basic resonant circuit 140. In response to the second response signal outputted from the conductive tail 110, the electronic apparatus 200 may perform a second function for an eraser function.

Accordingly, the stylus pen 100 may be implemented to provide different functions at the conductive tip 110 and the conductive tail 120 using the single resonant circuit 140-1.

FIG. 3C is a circuit diagram showing a circuit in which a capacitor, having a switch connected thereto and having a designated capacitance, is electrically connected to the basic resonant circuit shown in FIG. 3A in parallel.

Referring to FIG. 3C, the stylus pen 100 may include a resonant circuit 140-2, which has sum capacitance of the capacitance of the capacitor 145 included in the basic resonant circuit 140 and a designated capacitance of a second capacitor 148.

According to an embodiment of the present disclosure, the second capacitor 148 and a switch 149 connected to the second capacitor 148 may be implemented to be connected to the basic resonant circuit 140 and the conductive tail 120. On the other hand, the conductive tip 110 may be implemented to be connected to the basic resonant circuit 140.

For example, in response to the conductive tip 110 being brought into contact with the touch screen of the electronic apparatus 200, the conductive tip 110 may output a first resonant frequency having the capacitance of the capacitor 145 included in the basic resonant circuit 140 as a first response signal. In response to the first response signal outputted from the conductive tip 110, the electronic apparatus 200 may perform the first function for the pen input.

On the other hand, in response to the conductive tail 120 being brought into contact with the electronic apparatus 200, the switch 149 may be closed and the second capacitor 148 may be electrically connected to the basic resonant circuit 140 in parallel. In this case, the conductive tail 120 may output, as a second response signal, a second resonant frequency having a sum capacitance of the capacitance of the capacitor 145 included in the basis resonant circuit 140 and the capacitance of the second capacitor 148. In response to the second response signal outputted from the conductive tail 120, the electronic apparatus 200 may perform the second function for the eraser function.

According to another embodiment of the present disclosure, the conductive tip 110 may be implemented to be connected with the variable capacitor 147 and the resonant circuit 140 shown in FIG. 3B, and the conductive tail 120 may be implemented to be connected to the capacitor 148, which includes the switch 149 and has designated capacitance, and the resonant circuit 140, as shown in FIG. 3C, as described in greater detail below with reference to FIG. 5.

Accordingly, the stylus pen 100 may be implemented to provide different functions at the conductive tip 110 and the conductive tail 120 using the single resonant circuit.

According to another embodiment of the present disclosure, the resonant circuit unit 140 may be implemented by connecting, in parallel, a capacitor having a switch connected thereto and having designated capacitance. In response to the capacitor having the switch connected thereto being connected to the conductive tip 110, the user may turn on/off the input function of the conductive tip 110 through a switch or a button formed on the body 130 of the stylus pen 100. In addition, in response to a parallel capacitor having a switch connected thereto being connected to the conductive tail 120, the user may turn on/off the eraser function of the conductive tail 120 through a switch or a button formed on the body 130 of the stylus pen 100. In addition, by adding a parallel capacitor having a plurality of switches connected thereto to the resonant circuit unit 140, the user may select various functions, such as, for example, a first function for pen input of the stylus pen 100, a second function for an eraser function, a third function for a pointer function, and a fourth function for a coloring function.

According to another embodiment of the present disclosure, the variable capacitor 147 connected with the conductive tale 120 may be added to the resonant circuit unit 140 in parallel. In this case, the added parallel variable capacitor may be implemented to have a variable resonant frequency according to a pressure in response to the conductive tail 120 being brought into contact with the touch screen 210. The resonant circuit unit 140 may have a first variable capacitor connected to the conductive tip 110, and a second variable capacitor connected to the conductive tail 120.

The configurations of the circuits shown in FIGS. 3A to 3C explaining embodiments of the present disclosure, and the embodiments are not limited thereto and may be implemented by making various changes and combining.

Figure 4:
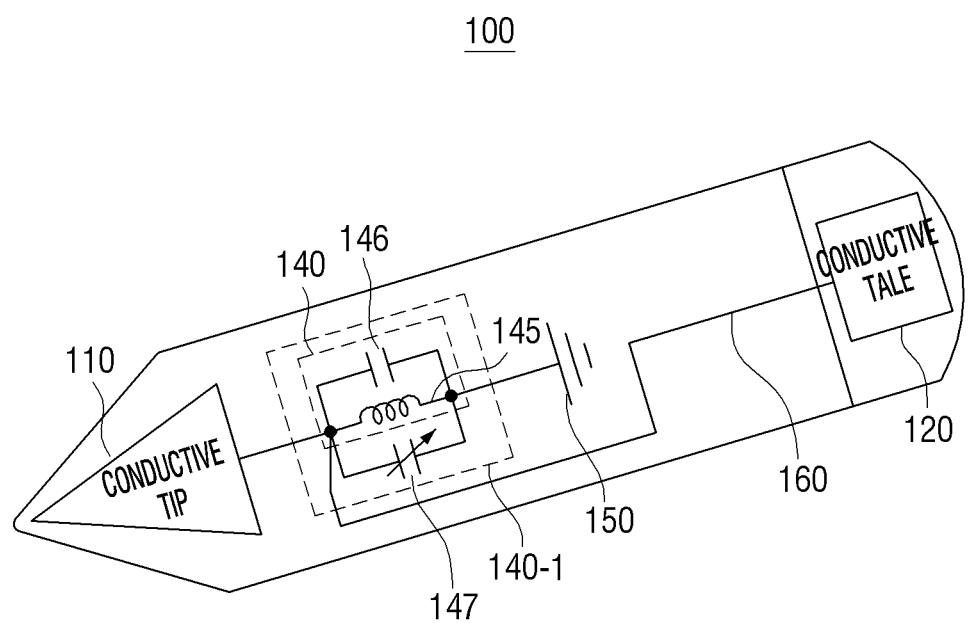
FIG. 4 is a diagram illustrating a configuration of a stylus pen in detail, according to an embodiment of the present disclosure.

FIG. 4 is a diagram illustrating a configuration of a stylus pen, according to an embodiment of the present disclosure.

Referring to FIG. 4, the stylus pen 100 may be implemented by using the resonant circuit unit 140-1 of FIG. 3B, for example. The resonant circuit unit 140-1 may include the basic resonant circuit 140 which includes the single inductor 145 and the single capacitor 146, and the single variable capacitor 147, which is electrically connected to the basic resonant circuit 140 in parallel.

The signal terminal, which is one end of the basic resonant circuit unit 140, may be electrically connected with the conductive tip 110 and the conductive tail 120, and the other end of the basic resonant circuit 140 may be grounded at ground 150. In this case, the ground 150 may be directly achieved via a stylus pen case made of conductive material. In addition, the ground 150 may be connected to a ground (GND) of the PCB.

Figure 12:
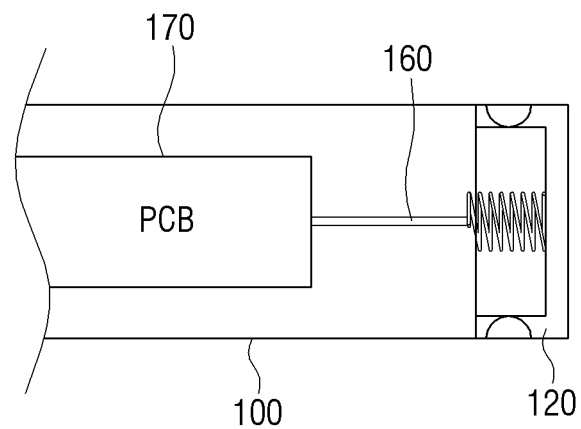
FIG. 12 is a diagram illustrating a cross section showing attachment and detachment of a conductive tail of a stylus pen in a body, according to an embodiment of the present disclosure.
Figure 13:
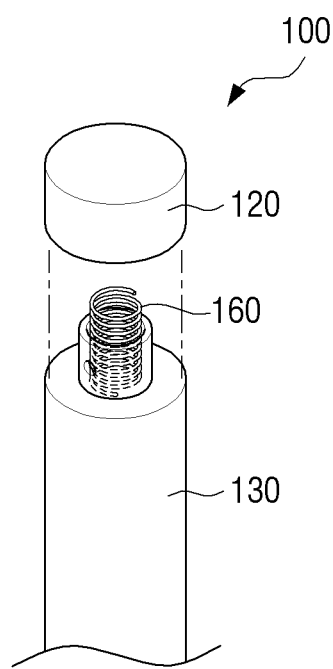
FIG. 13 is a diagram illustrating a perspective view showing attachment and detachment of a conductive tail of a stylus pen in a body, according to an embodiment of the present disclosure.

One end of the basic resonant circuit 140 may be connected to the conductive tail 120 through a conductive member 160, and an end of the conductive member 160 contacting the conductive tail 120 may have a spring shape, as shown in FIGS. 12 and 13.

As described above with reference to FIG. 3B, the variable capacitor 147 is connected with the inductor 145 and the capacitor 146, forming the basic resonant circuit 140 in parallel, and may have capacitance changed according to a change in the pressure applied when the conductive tip 110 is brought in contact with the touch screen 210. Accordingly, in response to the capacitance of the variable capacitor 147 being changed, the total capacitance of the resonant circuit 140-1 may be changed and the resonant frequency of the resonant circuit 140-1 may also be changed.

Accordingly, the conductive tip 110 and the conductive tail 120 may output a response signal having a basic resonant frequency of the resonant circuit 140 in response to the conductive tip 110 and the conductive tail 120 not being brought into contact with the touch screen 210. However, in response to the conductive tip 110 being brought into contact with the touch screen 210, the conductive tip 110 may output a first response signal having a first resonant frequency since the capacitance is changed by the variable capacitor 147.

On the other hand, in response to the conductive tail 120 being brought into contact with the touch screen 210, the conductive tale 120 may have a basic resonant frequency which is generated by the capacitor 146 of the resonant circuit 140. For convenience of explanation, the basic resonant frequency outputted from the conductive tail 120 is defined as a second resonant frequency. Accordingly, in response to the first response signal having the first resonant frequency being outputted, the stylus pen 100 may be implemented to perform the first function for the pen input function through the conductive tip 110. In response to a second response signal having the second resonant frequency being outputted, the stylus pen 100 may be implemented to perform the second function for the eraser function through the conductive tail 120.

Figure 5:
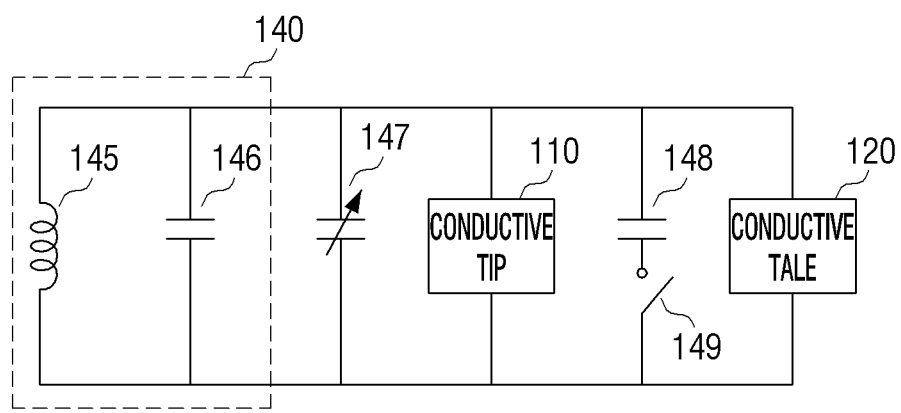
FIG. 5 is a diagram illustrating a stylus pen, according to another embodiment of the present disclosure.

FIG. 5 is a diagram illustrating a circuit of a stylus pen, according to another embodiment of the present disclosure.

Referring to FIG. 5, a resonant circuit unit 140-3 includes the inductor 145 and the capacitor 146 forming the basic resonant circuit 140, the variable capacitor 147, a second capacitor 148, and a switch 149.

As described above with reference to FIG. 3B, the variable capacitor 147 is electrically connected with the inductor 145 and the capacitor 146 forming the basic resonant circuit 140 in parallel in the resonant circuit 140-1, and is physically connected to the conductive tip 110 to have the capacitance of the resonant circuit 140-1 changed according to contact pressure of the conductive tip 110.

The second capacitor 148 may have predetermined capacitance, and is connected with the inductor 145 and the capacitor 146 forming the basic resonant circuit 140 in parallel through the switch 149 and may be electrically connected to the conductive tail 120.

The switch 149 may be turned on/off according to whether the conductive tail 120 is brought into contact with the electronic apparatus 200. That is, in response to the conductive tail 120 being brought into contact with the electronic apparatus 200, the switch 149 may be turned off. In response to the switch being turned off, the switch 149 may be opened, and thus, the second capacitor 148 may not be connected to the basic resonant circuit 140 and the conductive tail 120. On the other hand, in response to the conductive tail 120 not being brought into contact with the electronic apparatus 200, the switch 149 may be turned on. In response to the switch being turned on, the switch 149 may be closed, and thus, the second capacitor 148 may be connected to the basic resonant circuit 140 and the conductive tail 120 in parallel.

For example, in response to the conductive tail 120 being brought into contact with the electronic apparatus 200, a metal electrode plate, which is in contact with one end of the conductive tail 120, and is connected with the second capacitor 148 may be implemented to be disconnected from the one end of the conductive tail 120. Accordingly, the switch 149, which is connected to the second capacitor 148 may be opened and turned off. Accordingly, the total capacitance of the resonant circuit 140-3 may be equal to the capacitance 146 of the basic resonant circuit 140 minus the second capacitance 148. In this case, the designated capacitance of the second capacitor 148 may be implemented to be smaller than the capacitance of the capacitor 146 of the basic resonant circuit 140.

On the other hand, in response to the conductive tip 110 being brought into contact with the electronic apparatus 200, the total capacitance of the resonant circuit 140-3 may be a capacitance that is generated by adding the capacitance 146 of the resonant circuit and the variable capacitance 147.

According to an embodiment of the present disclosure, the resonant frequency of the resonant circuit 140-1 may have a different value according to the total capacitance. Accordingly, the first resonant frequency that the resonant circuit 140-1 has in response to the conductive tip 110 being brought into contact with the electronic apparatus 200 may be different from the second resonant frequency that the resonant circuit 140-1 has in response to the conductive tail 120 being brought into contact with the electronic apparatus 200.

As a result, the stylus pen 100 may be implemented to perform the pen function at the conductive tip 110 and perform the eraser function at the conductive tail 120, based on a difference in the total capacitance that the resonant circuit has in response to the conductive tip 110 and the conductive tail 120 being brought into contact with the electronic apparatus 200.

The above-described on/off control configuration of the switch 149 is provided as an example, and the control of the switch and the configuration of the capacitor having the switch connected thereto may be changed and implemented in various ways. For example, the switch 149 may be implemented to be closed and turned on in response to the conductive tail 120 being brought into contact with the electronic apparatus 200.

Figure 6A:
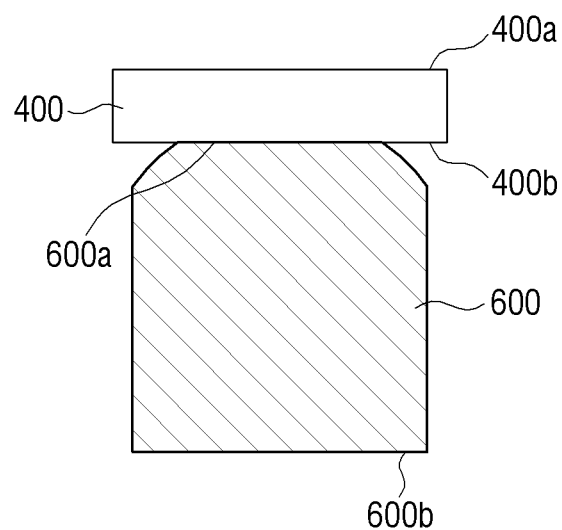
FIGS. 6A to 6C are diagrams illustrating cross sections of a dielectric substance and a conductive variable electrode forming a variable capacitor, according to an embodiment of the present disclosure.
Figure 6B:
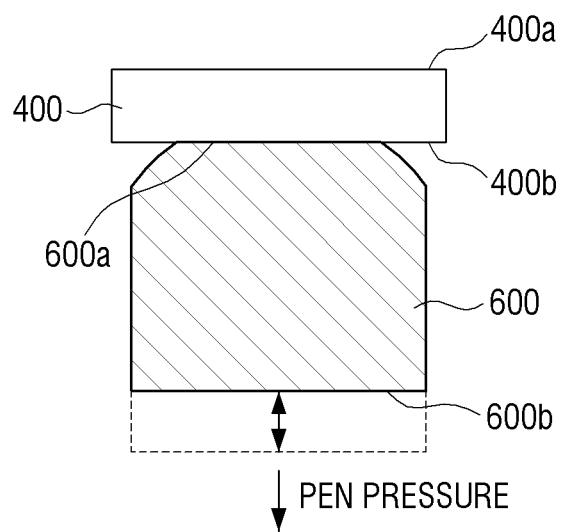
Figure 6C:
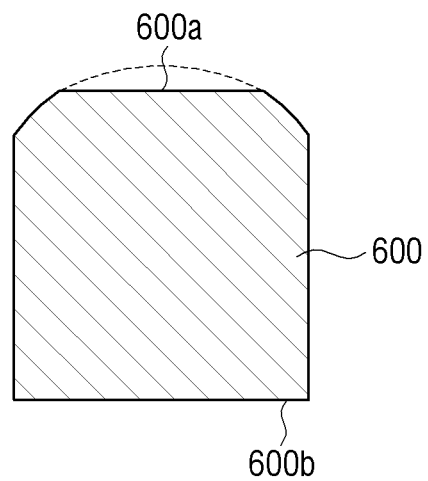

FIGS. 6A to 6C are diagrams illustrating cross sections of a dielectric substance and a conductive variable electrode forming a variable capacitor, according to an embodiment of the present disclosure.

Referring to FIG. 6A, the variable capacitor includes a dielectric substance 400 and a second electrode 600, which is a conductive variable electrode.

The dielectric substance 400 may be formed in a circular disk shape having predetermined thickness. In addition, the dielectric substance 400 includes a first surface 400a and a second surface 400b, which is formed opposite the first surface 400a. The dielectric substance 400 may have a predetermined dielectric constant.

The first surface 400a of the dielectric substance 400 may be in contact with a first electrode forming the variable capacitor 147, and the second surface 400b of the dielectric substance 400 may be in contact with the second electrode 600 forming the variable capacitor 147. The second electrode 600 may be brought into contact with the second surface 400b of the dielectric substance according to pen pressure applied through the conductive tip 110, thereby forming an area of the variable electrode. Herein, the second electrode may be formed of a conductive rubber. The second surface 400b of the dielectric substance may face the second electrode 600 with a specified distance therebetween.

The second electrode 600 may have a cylindrical shape. In addition, as shown in FIG. 6C, the second electrode 600 may have one cross section 600a formed to have a part thereof that is cut off, and the other cross section 600b formed flat. In this case, the plane area of the one cross section 600a may be smaller than the plane area of the other cross section 600b.

The one cross section 600a of the second electrode 600 may be disposed to be separated from the second surface 400b of the dielectric substance 400 or to be in contact with the second surface 400b of the dielectric substance 400.

FIG. 6B is a diagram illustrating the second electrode which is compressed and is brought into contact with the dielectric substance by the pen pressure of the conductive tip.

Referring to FIG. 6B, the other cross section 600b of the second electrode 600 receives the pen pressure applied through the conductive tip 110.

In response to the other cross section 600b receiving the pressure applied through the conductive tip 110, the one cross section 600a of the second electrode 600 may be brought into contact with the second surface 400b of the dielectric substance 400. Herein, the second electrode 600 is implemented by using a conductive rubber having elasticity. However, this is described as an example and the second electrode 600 may be implemented in various ways by using a variable electrode made of a conductive material.

The variable capacitor may detect the pen pressure of the conductive tip 110 and change the capacitance of the resonant circuit. In this case, the capacitance of the variable capacitor may increase in proportion to the contact area of the one cross section 600a of the second electrode 600 which is in contact with the second surface 400b of the dielectric substance 400.

For example, the one cross section 600a of the second electrode 600 has a part thereof cut off to have a flat surface. Embodiments of the present disclosure may be implemented by using the resonant circuit 140-1 or 140-3 illustrated in FIG. 4 or FIG. 5. In response to the conductive tip 110 being brought into contact with the touch screen 210, the cross sectional area of the one cross section 600a of the second electrode 600 at the moment that the one cross section 600a of the second electrode 600 is brought into contact with the second surface 400b of the dielectric substance 400 may be larger than the cross sectional area when the one cross section 600a is not cut to have a flat surface (for example, a round shape). Accordingly, the capacitance of the resonant circuit 140-1 or 140-3 may be implemented to have a designated large value according to the cross sectional area of the one cross section 600a of the second electrode 600 contacting the second surface 400b of the dielectric substance 400 in response to the conductive tip 110 being brought into contact with the electronic apparatus 200.

As described above with reference to FIG. 4, in response to the conductive tail 120 being brought into contact with the electronic apparatus 200, the conductive tail 120 may have the capacitance of the basic resonant circuit 140. In addition, as described above with reference to FIG. 5, in response to the conductive tail 120 being brought into contact with the electronic apparatus 200 or hovering over the electronic apparatus 200, the conductive tail 120 may have a capacitance that is equal to the capacitance of the basic resonant circuit 140 minus the designated capacitance of the second capacitor 148. Accordingly, in response to the stylus pen 100 being implemented by using the resonant circuit 140-1 of FIG. 4 or the resonant circuit 140-3 of FIG. 5, the capacitance of the resonant circuit 140-1 or 140-3 when the conductive tip 110 is brought into contact with the electronic apparatus 200 may be larger than the capacitance of the resonant circuit 140-1 or 140-3 when the conductive tail 120 is brought into contact with the electronic apparatus 200.

According to another embodiment of the present disclosure, the stylus pen 100 may have the resonant circuit 140-3 shown in FIG. 5, and the second electrode 600 which has one cross section 600a formed to have a flat surface. As described above with reference to FIG. 5, the second capacitor 148 may have a predetermined value, and may be electrically connected to the inductor 145 and the capacitor 146 forming the basic resonant circuit 140 in parallel through the switch 149, and may be physically connected with the conductive tail 120. The switch 149 may be implemented to be turned on/off according to whether the conductive tail 120 is brought into contact with the electronic apparatus 200 or not.

The predetermined value C1 of the second capacitor 148 may be implemented to be larger than the capacitance C2 of the variable capacitor 147, which changes according to the area at the moment that the one cross section 600a of the second electrode 600 is brought into contact with the second surface 400b of the dielectric substance 400 (C1>C2).

For example, in response to the conductive tail 120 being brought into contact with the electronic apparatus 200, the switch 149 may be turned on and closed, and, in response to the conductive tail 120 not being brought into contact with the electronic apparatus 200, the switch 149 may be turned off and opened. In response to the switch 149 being turned on, the switch 149 may be closed and the second capacitor 148 may be connected to the inductor 145 and the capacitor 146 of the basic resonant circuit 140 in parallel in the parallel resonant circuit 140-3. Accordingly, the conductive tail 120 may have a total capacitance, which is a sum of the capacitance C 146 of the basic resonant circuit 140 and the second capacitance C1 148 (total C=C+C1).

In response to the conductive tip 110 being brought into contact with the electronic apparatus 100, the conductive tip 110 may have a capacitance that is generated by adding capacitance C2 changed by the variable capacitor 147 and the capacitance C 146 of the basic resonant circuit 140 (total C=C+C2).

Accordingly, the total capacitance generated by the pen pressure of the conductive tip 110 (total C=C+C2) is smaller than the total capacitance generated by the conductive tail 120 (total C=C+C1) (C1>C2).

As a result, in response to the conductive tip 110 and the conductive tail 120 being brought into contact with the electronic apparatus 200, the resonance circuit 140-3 may have a different capacitance at the conductive tip 110 and the conductive tail 120. The conductive tip 110 and the conductive tail 120 may output different resonant frequency signals according to their respective capacitance. The electronic apparatus 200 may determine whether the conductive tip 110 is brought into contact with the electronic apparatus 200 (first response signal) or the conductive tail 120 is brought contact with the electronic apparatus 200 (second response signal), based on the different resonant frequency signals.

Accordingly, in response to it being detected that the conductive tip 110 of the stylus pen 100 is brought into contact with the touch screen 210, the electronic apparatus 200 may perform the first function for the pen input function, and, in response to it being detected that the conductive tail 120 is brought into contact with the touch screen 210, the electronic apparatus 200 may perform the second function for the eraser function. However, the above-described example is merely an embodiment explaining the present disclosure, and the capacitance may be changed according to the operation of the switch in various ways.

Figure 7:
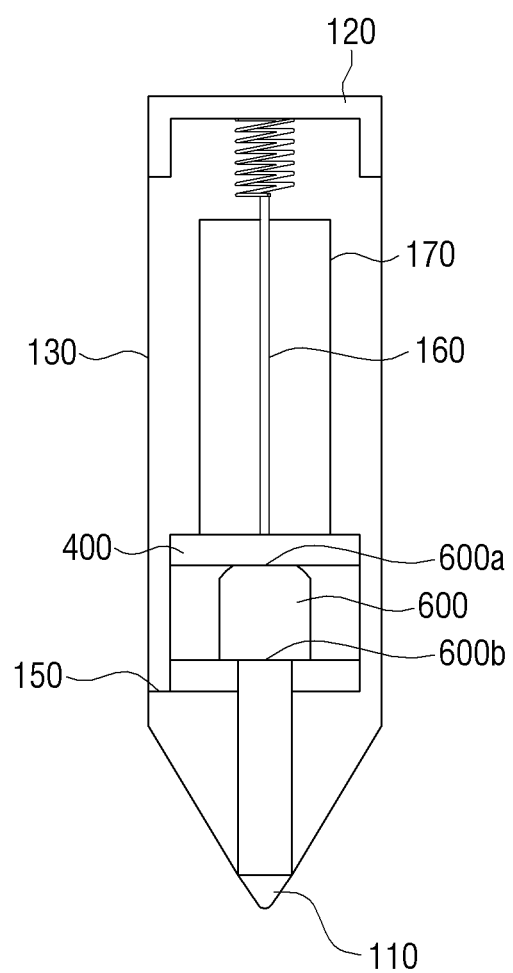
FIG. 7 is a diagram illustrating a configuration of a stylus pen to which a variable capacitor is applied, according to an embodiment of the present disclosure.

FIG. 7 is a diagram illustrating a configuration of a stylus pen to which a variable capacitor is applied, according to an embodiment of the present disclosure.

Referring to FIG. 7, the stylus pen 100 includes the conductive tip 110 and the conductive tail 120. The conductive tip 110 may be directly connected to a variable capacitor which includes the second electrode 600 which is a conductive variable electrode, and the dielectric substance 400. The dielectric substance 400 and the second electrode 600, which is the conductive variable electrode, are described above with reference to FIGS. 6A to 6C.

According to an embodiment of the present disclosure, a terminal of a first electrode of the variable capacitor, which is in contact with the first surface 400a of the dielectric substance 400, is connected to a body 130 of a metallic material or a GND of a PCB. The second electrode of the variable capacitor, which is in contact with one surface 600a of the second electrode indicating the variable electrode, is connected to the conductive tail 120 through a conductive member 160.

The conductive member 160 connects a signal terminal, which is one end of the resonant circuit unit 140, and the conductive tail 120. In addition, the conductive member 160 connects a signal terminal on the PCB 170 and the conductive tail 120. The conductive tail 120 is attachable and detachable, and a spring, which is one end of the conductive element 160 may be brought into contact with one cross section of the conductive tail 120, in response to the conductive tail 120 being attached to the stylus pen 100.

Figure 8:
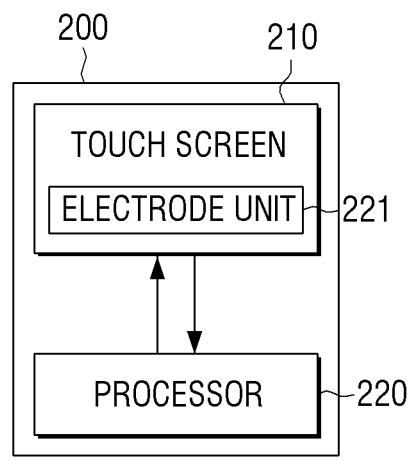
FIG. 8 is a block diagram illustrating a configuration of an electronic apparatus, according to an embodiment of the present disclosure.

FIG. 8 is a block diagram illustrating a configuration of an electronic apparatus, according to an embodiment of the present disclosure.

Referring to FIG. 8, the electronic apparatus 200 includes a touch screen 210 and a processor 220.

The touch screen 210 may be a display on which the user performs an interaction by touching or hovering with the stylus pen 100.

An electrode unit 221 is disposed in the touch screen 210. The electrode unit 221 may receive signals that are generated by a touch on the touch screen 210 or the stylus pen 100. The electrode unit 221 may include a plurality of electrodes arranged in a horizontal direction (hereinafter, referred to as first electrodes), and a plurality of electrodes arranged in a vertical direction (hereinafter, referred to as second electrodes).

In response to a response signal being received at one or more electrodes from among the electrodes in the electrode unit 221, the processor 220 may analyze the response signal and perform a different function of the stylus pen 100.

According to an embodiment of the present disclosure, in response to the conductive tip 110, which is a first side of the stylus pen 100, being brought into contact with the touch screen 210, and a first response signal being received through the electrode unit 221, the processor 220 may analyze the resonant frequency of the first response signal and perform the pen input function of the stylus pen 100, which is a first function. In addition, in response to the conductive tail 120, which is a second side of the stylus pen 100, being brought into contact with the touch screen 210, and a second response signal being received through the electrode unit 221, the processor 220 may analyze the resonant frequency of the second response signal and perform the eraser function of the stylus pen 100, which is a second function.

The processor 220 may recognize a contact surface based on a location where the conductive tip 110 and the conductive tale 120 are brought into contact with the touch screen 210. In addition, the processor 220 may determine a cross sectional area of the recognized contact surface.

In addition, in response to the determined contact cross sectional area being less than or equal to a designated value, the processor 220 may perform the first function for pen input on the touch screen 210. In response to the determined contact cross sectional area being greater than the designated value, the processor 220 may perform the second function for the eraser function on the touch screen.

In addition, the processor 220 may determine an erase area of the touch screen 210 according to the determined contact cross sectional area of the conductive tail 120.

For example, the processor 220 may determine the erase area of the touch screen 210 based on the contact cross sectional area by using technology for calculating exact coordinates of a contact portion on the touch screen 210. The processor 220 may measure a small change in capacitance of the electrodes at the contact point on the touch screen in an analogue method. The processor 220 may remove noise in the capacitance distribution of data regarding the small change in the capacitance collected in the above-described way using a software program. Through this process, the processor 220 may analyze a touch pattern on the touch screen 210 and calculate coordinates according to the size of the touched area.

In addition, the processor 220 may recognize a shape of the contact surface based on the location where the conductive tail 120 is brought into contact with the touch screen 210, and display the shape.

For example, the processor 220 may recognize the shape of the contact surface of the conductive tail 120 by combining technology for calculating exact coordinates of a contact portion on the touch screen 210, finger angle technology for estimating an angular position of the contact portion on the touch screen 210, various sensor technologies, and a display technology supporting a high resolution, and display the shape. The above-described embodiments of the present disclosure are exemplary and are not intended to limited embodiments of the present disclosure.

Figure 9:
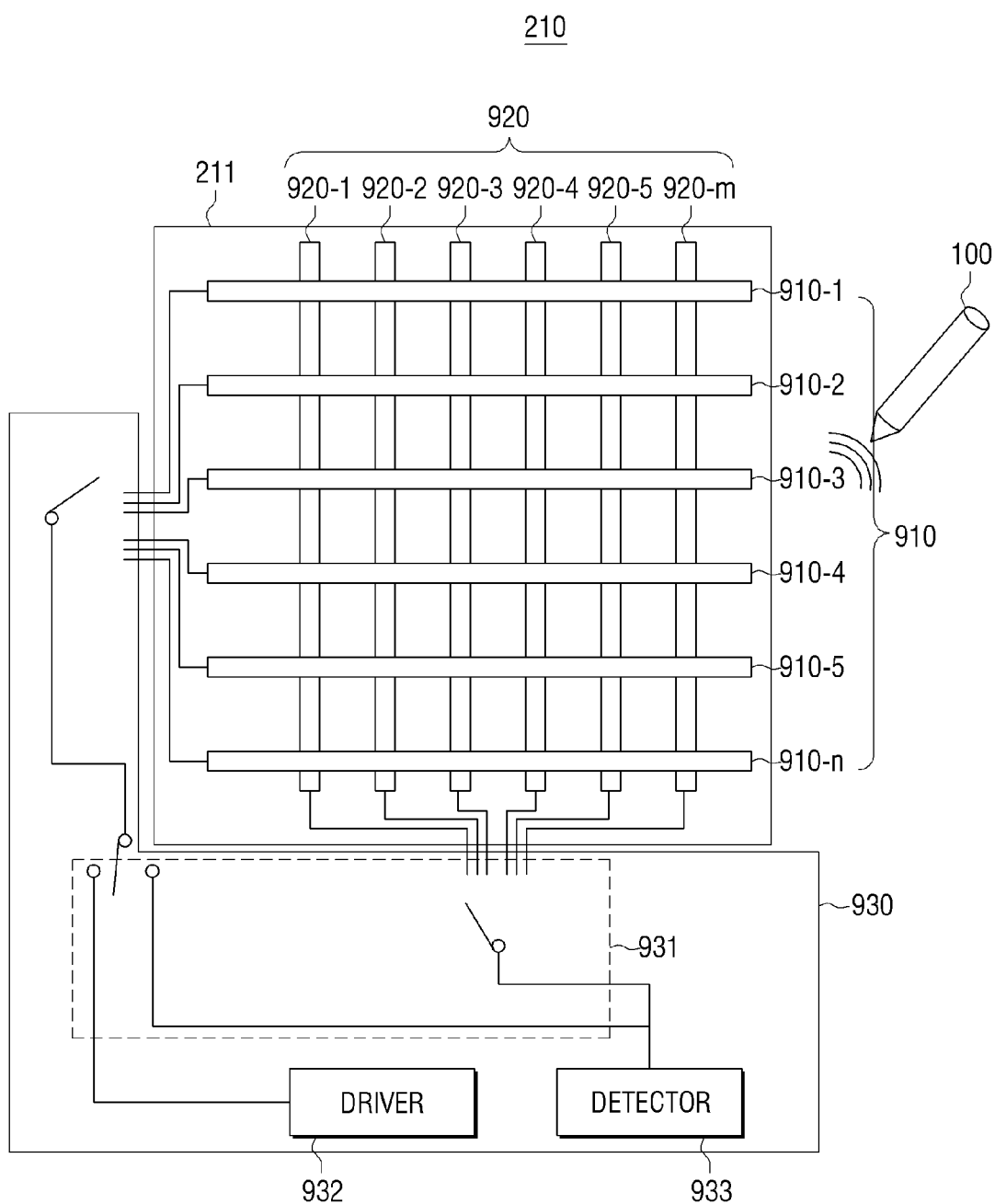
FIG. 9 is a diagram illustrating an electrode configuration of an electronic apparatus, according to an embodiment of the present disclosure.

FIG. 9 is a diagram illustrating an electrode configuration in the electronic apparatus, according to an embodiment of the present disclosure. Referring to FIG. 9, the touch screen 210 includes the electrode unit 211 and a panel controller 930.

The electrode unit 211 includes a plurality of electrodes. Specifically, as shown in FIG. 9, the electrode unit 211 includes a first electrode group 910 and a second electrode group 920, which are arranged in different directions.

The first electrode group 910 includes a plurality of first electrodes 910-1, 910-2, 910-3, 910-4, 910-5, . . . , 910-$n$ aligned with one another in a first direction (horizontal direction).

The first electrode may be implemented using a transparent electrode such as, for example, indium tin oxide (ITO). The plurality of first electrodes 910-1, 910-2, 910-3, 910-4, 910-5, . . . , 910-n may be used as transmission electrodes to output a signal (a transmission (Tx) signal) for detecting the location of the stylus pen 100.

The second electrode group 920 includes a plurality of second electrodes 920-1, 920-2, 920-3, 920-4, 920-5, . . . , 920-m aligned with one another in a second direction (vertical direction). The second electrodes may also be implemented using a transparent electrode. The plurality of second electrodes 920-1, 920-2, 920-3, 920-4, 920-5, . . . , 920-m may be used as reception electrodes to receive a response signal outputted from the stylus pen 100.

Each of the electrodes in the electrode group has a simple rectangular shape. However, in practice, each of the electrodes may have a more complicated shape. In addition, the areas, shapes, and numbers of the first electrodes and the second electrodes may be set equally or differently, according to the shape of the touch screen 210.

The panel controller 930 may output a transmission signal and receive a response signal using the first electrode group 910 and the second electrode group 920. For convenience of explanation, a period for outputting the transmission signal is referred to as a transmission period, and a period for receiving the response signal is referred to as a reception period. The transmission period and the reception period are alternately repeated. The panel controller 930 includes a switch unit 931, a driver 932, and a detector 933.

The driver 932 applies a driving signal to the electrode unit 211 during the transmission period. The driving signal may be a sine waveform signal having a predetermined resonant frequency. Specifically, the driver 932 may apply an electric signal to the plurality of first electrodes 910-1, 910-2, 910-3, 910-4, 910-5, . . . , 910-n simultaneously or in sequence during the transmission period. Alternatively, the driver 932 may apply the driving signal based on a predetermined number of electrodes (for example, two to five electrodes) in sequence. In this case, the predetermined number of electrodes may be electrodes that are arranged consecutively, or may be electrodes that are selected from the plurality of electrodes according to a predetermined pattern.

The detector 933 may receive the response signal at each of the electrodes in the electrode unit 211 during the reception period. The response signal may be received in various patterns.

According to an embodiment of the present disclosure, the detector 933 may receive the response signals using both the first electrode group 910 and the second electrode group 920, or may receive the response signals using only the second electrode group 920, which is not used for transmitting.

In addition, the detector 933 may receive the response signals based on each electrode in sequence, or receive the response signals based on a predetermined number of electrodes. Alternatively, the detector 933 may receive the response signals simultaneously through all of the electrodes.

The detector 933 may perform various signal processing operations with respect to the received response signals. For example, the detector 933 may amplify the response signals using an amplifier. Alternatively, the detector 933 may perform signal processing to differentially amplify based on two response signals. In addition, the detector 933 may perform signal processing to extract only the information within a predetermined frequency domain from among the received response signals.

According to an embodiment of the present disclosure, the operations of the driver 932, the detector 933, and the switch unit 930 may be controlled by the processor 220, or may be controlled by a microcontroller separately provided in the panel controller 930. Herein, the operations are controlled by the processor 220.

The processor 220 may control the driver 932, the detector 933, and the switch unit 931 to perform applying the driving signal and receiving the response signal for each electrode, alternately.

For example, the processor 220 may control the driver 932 to apply the same driving signal to the plurality of first electrodes 910-1, 910-2, 910-3, 910-4, 910-5, . . . , 910-n simultaneously during a first time period. Then, the processor 220 may control the detector 933 to detect the response signal through at least one electrode (for example, 920-1) during a second time period. Thereafter, the processor 220 may control the driver 932 to apply the same driving signal to the plurality of first electrodes 910-1, 910-2, 910-3, 910-4, 910-5, . . . , 910-n again during a third time period, and then may control the detector 933 to receive the response signal through another electrode (for example, 920-2) during a fourth time period. The processor 220 may repeat the above-described process for all of the electrodes. For example, when there are six first electrodes and six second electrodes, the processor 220 may repeat the applying/receiving operations 12 times in total.

In response to the response signals being received at the plurality of electrodes, the processor 220 may determine a pen input point and an eraser point of the stylus pen 100 based on a ratio between the response signals received at the first electrodes 910-1, 910-2, 910-3, 910-4, 910-5, . . . , 910-n, and a ratio between the response signals received at the second electrodes 920-1, 920-2, 920-3, 920-4, 920-5, . . . , 920-m.

For example, in response to the intensity of the response signal of one first electrode 910-3 being greater than the intensities of the response signals of the other first electrodes 910-1, 910-2, 910-4, 910-5, . . . , 910-n, and in response to the intensity of the response signal of one second electrode 920-2 being greater than the intensities of the response signals of the other second electrodes 920-1, 920-3, 920-4, 920-5, . . . , 920-m, the processor 220 may determine a location where the first electrode 910-3 and the second electrode 920-2 intersect as the pen input point or eraser point of the stylus pen.

As described above, the driving signal is applied to all of the first electrodes simultaneously during the transmission period. However, the driving signal may be applied based on each electrode in sequence or may be applied based on a plurality of first electrodes.

In response to the stylus pen 100 being placed between two electrodes rather than being placed exactly on a single electrode, the processor 220 may determine the location of the stylus pen 100 using an interpolation method, which is based on a ratio between the response signal of an electrode that receives the greatest response signal, and the response signal received at an electrode adjacent to the corresponding electrode. When the interpolation method is used, a resolution may be enhanced so that the pen input point or the eraser point of the stylus pen 100 can be easily identified.

The switch unit 931 may selectively connect the plurality of electrodes to the driver 932 or may selectively connect the plurality of electrodes to the detector 933. Specifically, the switch unit 931 may connect an electrode to apply the driving signal to the driver 932 under the control of the processor 220. The switch unit 931 may ground or float the electrodes to which the driving signal is not applied. In addition, the switch unit 931 may ground at least one of the plurality of first electrodes and second electrodes during the reception period.

As described above, the switch unit 931 is controlled by the processor 220. However, in practice, the switch unit 931 may be controlled by the driver 932 when the driving signal is applied, and the switch unit 931 may be controlled by the detector 933 when the response signal is received. In addition, when a separate controller is provided in the panel controller 930 as described above, the switch unit 931 may be controlled by the controller.

In addition, in FIG. 9, the plurality of electrodes are arranged in a matrix pattern. However, in practice, the electrodes may be arranged in other patterns. In addition, in FIG. 9, only one driver and one detector are illustrated, but in practice, a plurality of drivers and/or a plurality of detectors may be provided.

As described above, the electronic apparatus 200 may determine the pen input point or eraser point of the stylus pen 100 using the electrode unit 210. In addition, the electronic apparatus 200 may detect a tilt characteristic of the stylus pen 100 to compensate for the pen input point or eraser point, or may use the tilt characteristic as an input for a separate interaction.

Figure 10A:
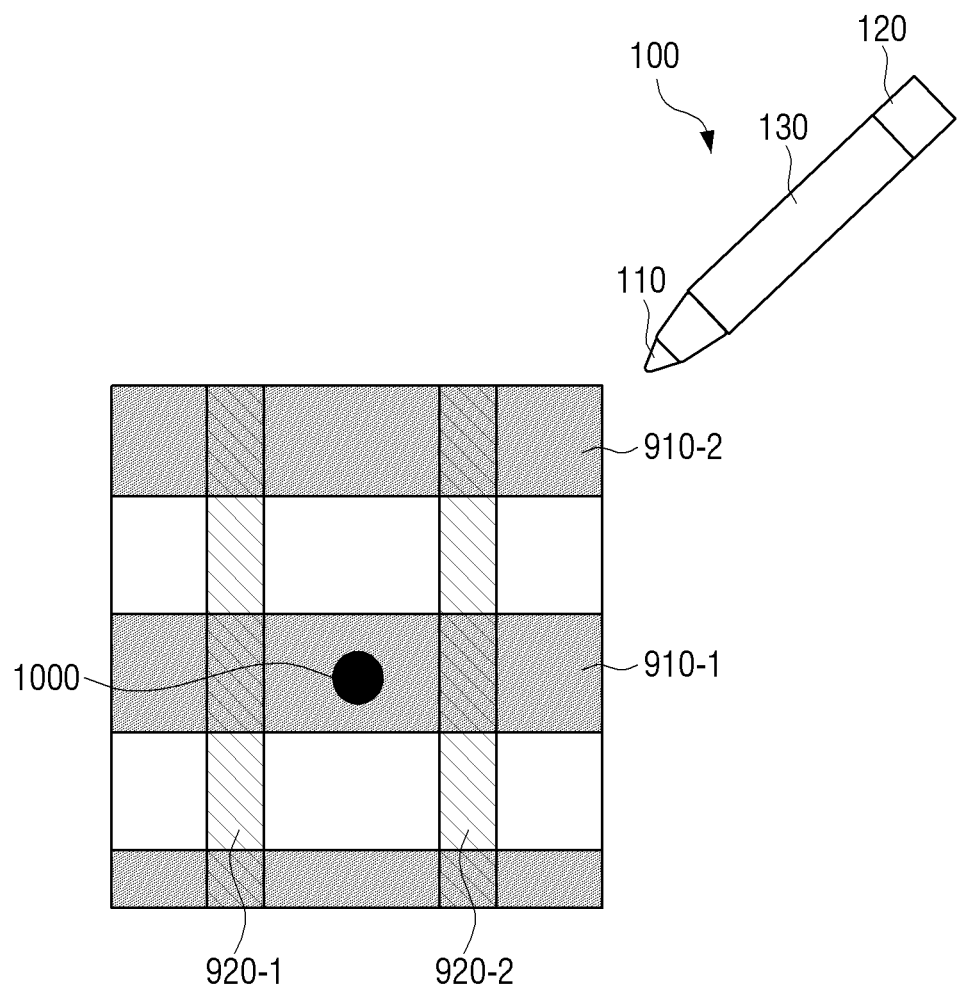
Figure 10B:
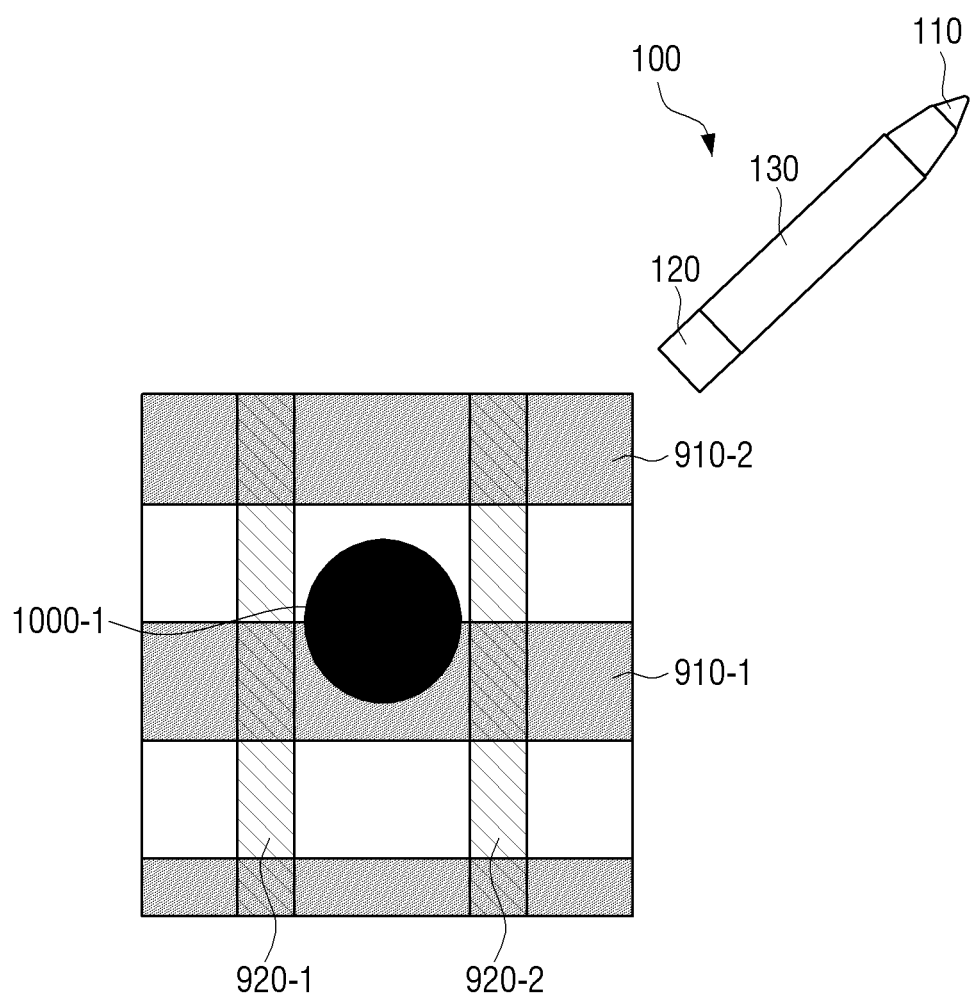

FIGS. 10A to 10C are diagrams illustrating a state in which a user touches a touch screen using a stylus pen, according to an embodiment of the present disclosure.

FIG. 10A is a view illustrating a case in which the conductive tip 110 of the stylus pen 100 touches the touch screen 210. FIG. 10B is a view illustrating a case in which the conductive tail 120 of the stylus pen 100 touches the touch screen 210. Referring to FIGS. 10A and 10B, the area of a plurality of first electrodes 910-1 and 910-2 arranged in the horizontal direction is larger than the area of second electrodes 920-1 and 920-2, and the area of the second electrodes 920-1 and 920-2 is small. However, this is not a limiting element of embodiments of the present disclosure.

As shown in FIG. 10A, a pen input point 1000 of the conductive tip 110 of the stylus pen 100 is located on the first electrode 910-1 from among the plurality of first electrodes 910-1 and 910-2 in the y-axis direction, and is located between the plurality of second electrodes 920-1 and 920-2 in the x-axis direction.

Referring to FIG. 10B, an eraser input point 1000-1 of the conductive tail 120 of the stylus pen 100 is located on the first electrode 910-1 from among the plurality of first electrodes 910-1 and 910-2 in the y-axis direction, and is located between the plurality of second electrodes 920-1 and 920-2 in the x-axis direction. The area of the eraser point which is the input point 1000-1 of the conductive tail 120 may be greater than or equal to the area of the input point 1000 of the conductive tip 110. In addition, the input point 1000-1 of the conductive tail 120 may be an eraser area for erasing the input point 1000 of the conductive tip 110.

FIG. 10C is a view illustrating states in which the conductive tip of the stylus pen 100 and the conductive tail 120 having various shapes touch the touch screen 210. Referring to FIG. 10C, the input point 1000 of the conductive tip 110 may be smaller than the areas of the input points 1000-1, 1000-2, and 1000-3 of the conductive tail 120. In this case, the conductive tail 120 may be configured to be attachable to or detachable from the conductive body 130.

As shown in FIG. 10C, the conductive tail 120 may have various shapes. In response to the conductive tail 120 being brought into contact with the touch screen 210, the electronic apparatus 200 having a high resolution may recognize a shape of the conductive tail 120 contacting the touch screen 210, and display the shape. The electronic apparatus 200 may determine the eraser area based on a contact cross sectional area, which is determined according to the recognized contact shape of the conductive tail 20.

Figure 11:
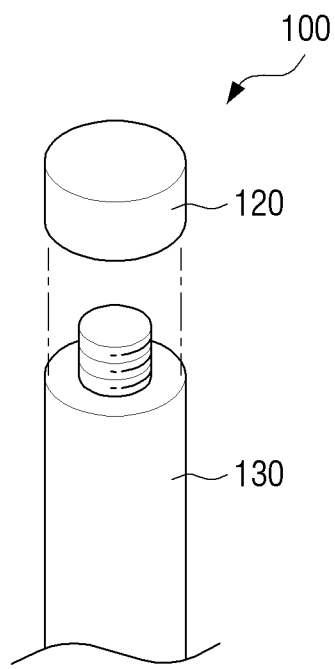
FIG. 11 is a diagram showing an attachable configuration and a detachable configuration of a conductive tail of a body of a stylus pen, according to an embodiment of the present disclosure.

FIG. 11 is a diagram illustrating the attachable and detachable configuration of the conductive tail of the stylus pen, according to an embodiment of the present disclosure.

Referring to FIG. 11, the conductive tail 120 may be attached to or detached from the body 130 of the stylus pen 100. In FIG. 11, the conductive tail 120 is attached or detached by a screw connection. However, this embodiment is exemplary and should not be considered as limiting. The conductive tail 120 may be attached to or detached from the body 130 in a clip type connection. In addition, the conductive tail 120 may be attached or detached via a one-touch button method by means of a button provided on the body 130.

FIG. 12 is a diagram illustrating a cross section showing attaching and detaching of the conductive tail of the stylus pen, according to an embodiment of the present disclosure.

Referring to FIG. 12, the stylus pen 100 includes the PCB 170 with the resonant circuit 140, and the conductive member 160, which is connected to the PCB 170 to connect the signal terminal of the resonant circuit 140 to the conductive tail 120. As shown in FIG. 12, the conductive member 160 has a spring structure formed at one end thereof to be brought into contact with the upper cross section of the conductive tail 120. The conductive tail 120 may be attached to or detached from the body 130 of the stylus pen 100.

FIG. 13 is a diagram illustrating a perspective view showing attachment and detachment of the conductive tail of the stylus pen, according to an embodiment of the present disclosure.

Referring to FIG. 13, the conductive tail 120 may be detached from the body 130 of the stylus pen 100. The conductive tail 120 is connected with the PCB through the conductive member 160 in the stylus pen 100 before being disconnected from the body 130. One end of the conductive member 160 is formed to have the spring structure to connect the signal terminal in the PCB 170 to the attachable and detachable conductive tail 120. In response to the conductive tail 120 being detached from the body 130, the one end of the conductive member 160 may be exposed to the outside. In addition, the conductive member 160 may be configured to have an insulator or a conductor enclosing the spring structure.

Figure 14:
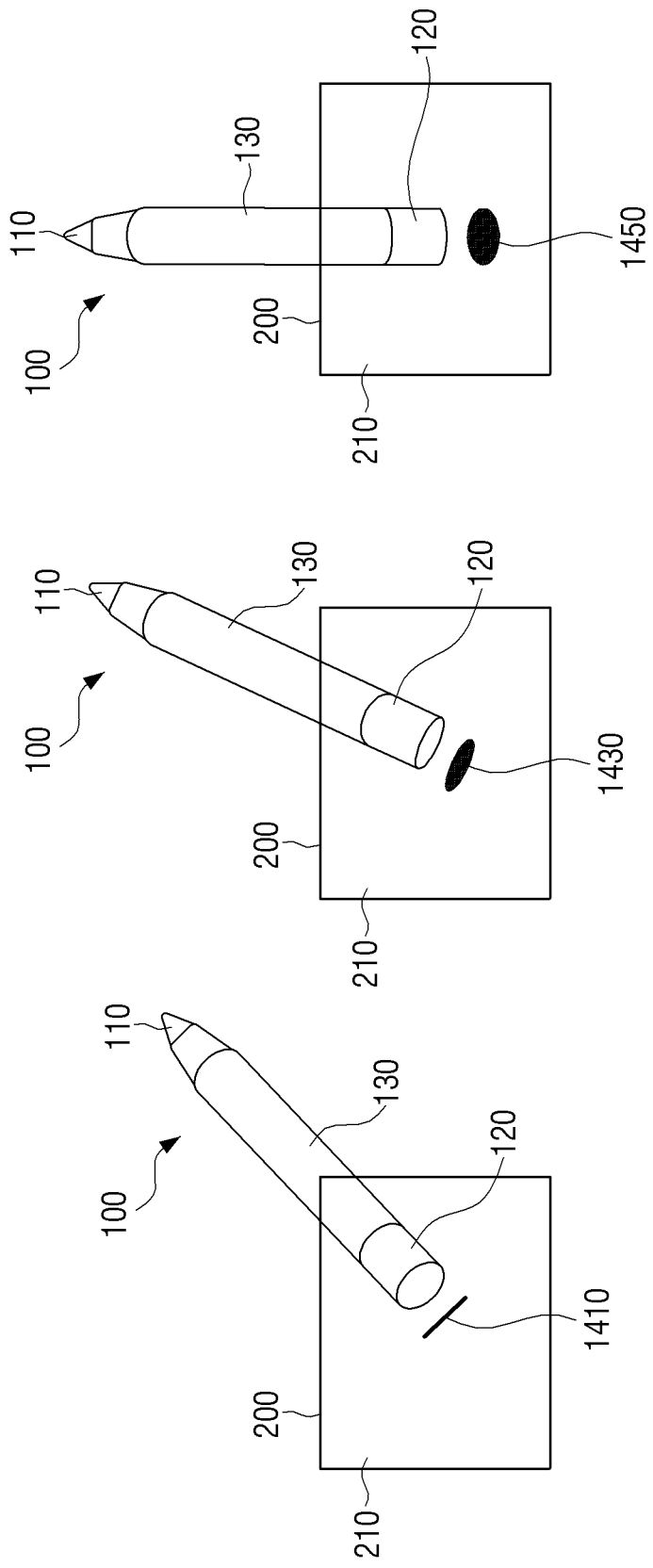
FIG. 14 is a diagram illustrating an erase area of a conductive tail, according to an embodiment of the present disclosure.

FIG. 14 is a diagram illustrating an eraser area of the conductive tail of the stylus pen, according to an embodiment of the present disclosure.

Referring to FIG. 14, an area on which the cross section of the conductive tail 120 is in contact with the touch screen 210 or hovers may vary according to the tilt of the conductive tail 120. When the user wishes to erase a narrow area 1410 of the touch screen 210, the user increases the tilt of the stylus pen 100 and brings a corner of the conductive tail 120 into contact with the touch screen 210 or makes the corner hover over the touch screen 210. When the user wishes to erase an area 1430 of the touch screen 210, the user may tilt the stylus pen 100 moderately and bring one surface of the conductive tail 120 into contact with the touch screen 210 or make one surface hover over the touch screen 210. In addition, when the user wishes to erase a large area 1450 of the touch screen 210, the user may bring the stylus pen 100 into contact with the touch screen 210 in a perpendicular direction, and may bring the cross section of the shape of the conductive tail 120 into contact with the touch screen 210 or make the cross section hover over the touch screen 210.

According to another embodiment of the present disclosure, the electronic apparatus 200 may display a graphic user interface (GUI) indicating the sizes of the erase areas on the touch screen 210. In response to one surface 1410, 1430, or 1450 of the conductive tail 210 being brought into contact with or hovering over the touch screen 210, the electronic apparatus 200 may display the GUI indicating the sizes of the erase areas in order on the touch screen 210. In this case, the user may select a size of an erase area, and the electronic apparatus 200 may perform the eraser function according to the selected size of the area. In response to the user selecting the size of the erase area through the GUI, the electronic apparatus 200 may perform the eraser function according to the size of the erase area selected by the user even when the conductive tail 120 touches or hovers over the touch screen, according to a change in the tilt in the middle of performing the eraser function.

Figure 15:
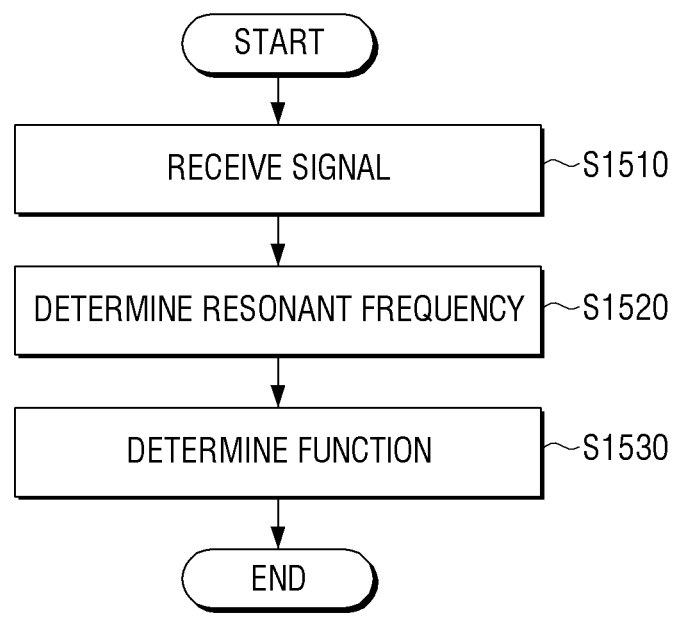
FIG. 15 is a flowchart illustrating a control method of an electronic apparatus, according to an embodiment of the present disclosure.

FIG. 15 is a flowchart illustrating a control method of the electronic apparatus, according to an embodiment of the present disclosure.

Referring to FIG. 15, the electronic apparatus 200 receives a response signal, which is generated in the stylus pen 100, for the touch screen 210, in step S1510.

For example, in response to the conductive tip 110 of the stylus pen 100 being brought into contact with or hovering over the touch screen 210, the conductive tip 110 may output, to the electrode unit 211 of the touch screen 210, a first response signal having a first resonant frequency, which is generated by the resonant circuit unit 140-1 including the variable capacitor 147. In response to the conductive tail 120 of the stylus pen 100 being brought into contact with or hovering over the touch screen 210, the conductive tail 120 may output, to the electrode unit 211 of the touch screen 210, a second response signal having a second resonant frequency which is generated by the basic resonant circuit unit 140.

The electronic apparatus 200 determines the response signal based on the resonant frequency received from the stylus pen 100, in step S1520. The electronic device 200 may distinguish between the first response signal and the second response signal based on the resonant frequency of a designated range.

The electronic apparatus 200 determines a function of the stylus pen 100 based on the response signal received at each electrode and the determined resonant frequency, in step S1530. For example, in response to the first response signal being received from the stylus pen 100, the electronic apparatus 200 may be implemented to perform a first function for a pen input function of the conductive tip 110. In response to the second response signal being received from the stylus pen 100, the electronic apparatus 200 may be implemented to perform a second function for an eraser function of the conductive tale 120.

As described above, the stylus pen 100, according to an embodiment of the present disclosure, may provide the conductive tip 110 having a pen function at a first end and the conductive tail 120 having an eraser function, which is attachable and detachable, at a second end, using a single resonant circuit. Accordingly, the manufacturing cost of the stylus pen can be reduced and user convenience can be enhanced.

The various control methods described above may be performed by the electronic apparatus having the configuration of FIG. 8. However, the embodiment shown in FIG. 8 should not be considered as limiting. The configuration of the electronic apparatus may be changed or may further include elements according to the type, using field, or other conditions of the electronic apparatus. For example, the electronic apparatus may further include a communication means for communicating in various communication methods, such as WiFi, Bluetooth, near field communication (NFC), etc., a video processor for processing video signals, an audio processor for processing audio signals, a GPU, a microphone, a camera, a speaker, a storage, and various interfaces. In addition, various memories, which are used by the processor 220, such as a random access memory (RAM) or a read only memory (ROM), a buffer, a register, etc. may be added.

The storage may store various programs and data necessary for the operations of the electronic apparatus 200. The storage may store a variety of software in addition to an operating system (O/S) or a kernel. Specifically, a user interface (UI) framework, a tilt detection module, an input point determination module, a touch recognition module, a hovering recognition module, a shape recognition module, a function setting module, etc. may be stored in the storage.

The UI framework is a module for generating various UIs. The UI framework may include an image compositor module to configure various objects in a screen, a coordinates compositor module to calculate coordinates for displaying the objects, a rendering module to render the configured objects on the calculated coordinates, a 2D/3D UI toolkit to provide a tool for configuring a UI in the form of 2D or 3D.

In response to the stylus pen 100 touching the surface of the touch screen 210 or drawing, the UI framework may draw various graphic lines, that is, a writing trace, or may erase inputted information according to the movement of the stylus pen 100. In addition, the UI framework may generate various UIs, as described above, and change the display state of the writing trace according to the tilt of the stylus pen.

The tilt detection module is software that analyzes characteristics of signals received from the electrodes of the touch screen 210, and detects characteristics of the stylus pen 100, such as a tilt direction, a tilt angle, etc. The tilt characteristic detected by the tilt detection module may be provided to the touch recognition module and the hovering recognition module.

The touch recognition module is a module for recognizing a touch point on the touch screen 210 where user's hand or the stylus pen 100 touches. The touch recognition module may analyze signals transmitted from the electrodes in the touch screen 210, and detect coordinates of the touch point. In addition, in response to the tilt characteristic being provided from the tilt detection module, the touch recognition module may compensate for an input point according to the tilt characteristic.

The hovering recognition module is a module for recognizing a point on the touch screen 210 over which the stylus pen 100 hovers, that is, an input point. The hovering recognition module may compensate for the input point in view of the tilt characteristic. The hovering recognition module and the touch recognition module may be implemented as a single module or as different modules.

The shape recognition module is a module for recognizing the shape of the conductive tale 120 of the stylus pen 100. The shape recognition module may determine an eraser area which is an input point of the conductive tail 120 by considering the characteristics of various shapes of the conductive tale 120.

The panel control module is a software module for controlling the panel controller in the touch screen 210. A processor may control the panel controller to perform applying a driving signal and detecting a response signal alternately according to execution of the panel control module, as described above.

The function setting module is a software module for setting various options or functions according to the tilt of the stylus pen 100. As described above, the user may set a function in various ways.

The processor may execute the software modules stored in the storage, and perform various operations, as described above. However, the above-described embodiments should not be considered as limiting. For example, the processor may be implemented by using a system on chip (SoC) having a software module embedded therein, or an integrated circuit (IC), or may be implemented in other forms.

In addition, a program for performing the above-described control method may be stored in various recording media in addition to the storage, and may be mounted in the electronic apparatus.

For example, a non-transitory computer readable medium, which stores the program performed through the processor of the electronic apparatus may be provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium, such as a compact disc (CD), a digital versatile disc (DVD), a hard disk, a Blu-ray disk, a universal serial bus (USB), a memory card, a ROM or etc., and may be provided.

While the present disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A stylus pen for use with an electronic apparatus, the stylus pen comprising:
   a conductive tip disposed at a first end of the stylus pen;
   a conductive tail disposed at a second end of the stylus pen; and
   a resonant circuit unit electrically connected to the conductive tip and the conductive tail, the resonant circuit being configured to generate a first response signal having a first resonant frequency corresponding to a signal entering the conductive tip from the electronic apparatus, to output the first response signal through the conductive tip, to generate a second response signal having a second resonant frequency corresponding to a signal entering the conductive tail from the electronic apparatus, and to output the second response signal through the conductive tail,
   wherein the first resonant frequency is different from the second resonant frequency.

2. The stylus pen of claim 1, wherein:
   the first response signal is for performing a pen input function in the electronic apparatus; and
   the second response signal is for performing an eraser function in the electronic apparatus.

3. The stylus pen of claim 1, further comprising a variable capacitor that is electrically connected in parallel to the resonant circuit unit, that is disposed between the conductive tip and the resonant circuit unit, and that changes the frequency of the first response signal according to a pressure applied to the conductive tip.

4. The stylus pen of claim 3, wherein the variable capacitor comprises:
   a dielectric substance comprising a first surface and a second surface, the second surface being disposed opposite the first surface;
   a first electrode that is in contact with the first surface; and
   a second electrode that is a conductive variable electrode having a first surface that brought into contact with the second surface of the dielectric substance according to a pressure applied through the conductive tip.

5. The stylus pen of claim 4, wherein the first surface of the second electrode is formed by cutting an upper end of the second electrode to have a flat surface.

6. The stylus pen of claim 4, wherein the frequency of the first response signal varies according to a contact area of the second electrode.

7. The stylus pen of claim 3, further comprising:
   a second capacitor having a predetermined capacitance; and
   a switch that is configured to connect in parallel the second capacitor to the variable capacitor, and electrically connect the second capacitor to the conductive tail.

8. The stylus pen of claim 1, wherein the conductive tail has a cross sectional area that is larger than that of the conductive tip, and is a replaceable model having at least one shape.

9. An electronic apparatus comprising:
   a touch screen;
   an electrode unit that is included in the touch screen and that receives a response signal generated in a stylus pen; and
   a processor configured to, in response to a first end of the stylus pen being brought into contact with the touch screen and a first response signal having a first resonant frequency being received through the electrode unit, perform a first function, and, in response to a second end of the stylus pen being brought into contact with the touch screen and a second response signal having a second resonant frequency being received through the electrode unit, perform a second function,
   wherein the first resonant frequency is different from the second resonant frequency.

10. The electronic apparatus of claim 9, wherein the first end of the stylus pen is a conductive tip and the second end of the stylus pen is a conductive tail.

11. The electronic apparatus of claim 9, wherein the first function is a pen input function and the second function is an eraser function.

12. The electronic apparatus of claim 9, wherein the processor is further configured to recognize a contact surface based on a location where at least one of the conductive tip and the conductive tail is brought into contact with the touch screen, and determine a cross sectional area of the contact surface.

13. The electronic apparatus of claim 12, wherein the processor is further configured to, in response to the cross sectional area being less than or equal to a designated value, perform a pen input function on the touch screen, and, in response to the cross sectional area being greater than the designated value, perform an eraser function on the touch screen.

14. The electronic apparatus of claim 12, wherein the processor is further configured to determine an eraser area of the touch screen according to the cross sectional area.

15. A control method of an electronic apparatus, comprising:
    performing a first function, in response to a first end of a stylus pen being brought into contact with a touch screen of the electronic apparatus and a first response signal having a first resonant frequency being received at the electronic apparatus, wherein the first end of the stylus pen is a conductive tip and the second end of the stylus pen is a conductive tail; and
    performing a second function, in response to a second end of the stylus pen being brought into contact with the touch screen and a second response signal having a second resonant frequency being received at the electronic apparatus, by recognizing a contact surface based on a location where at least one of the conductive tip and the conductive tail are brought into contact with the touch screen and determining a cross sectional area of the contact surface,
    wherein the first resonant frequency is different from the second resonant frequency.

16. The control method of claim 15, further comprising:
    performing the first function on the touch screen, in response to the cross sectional area being less than or equal to a designated value; and
    performing the second function on the touch screen, in response to the cross sectional area being greater than the designated value.

17. The control method of claim 15, wherein the first function is a pen input function and the second function is an eraser function.

18. A stylus pen for use with an electronic apparatus, the stylus pen comprising:
    a body;
    a conductive tip disposed at a first end of the body;
    a conductive tail disposed at a second end of the body;
    a switch disposed on the body; and
    a resonant circuit disposed within the body and electrically connected to the conductive tip and the conductive tail,
    wherein the resonant circuit comprises a first capacitor and a second capacitor, and is configured to output a first response signal having a first resonant frequency through the conductive tip, and to output a second response signal having a second resonant frequency through the conductive tail, the first resonant frequency being different from the second resonant frequency,
    wherein the switch is connected with the second capacitor,
    wherein, based on the conductive tip contacting the electronic apparatus, the second capacitor electrically is disconnected from the first capacitor by opening the switch, and
    wherein, based on the conductive tail contacting the electronic apparatus, the second capacitor electrically is connected with the first capacitor by closing the switch.

* * * * *